(12) United States Patent
Cao

(10) Patent No.: US 8,441,753 B2
(45) Date of Patent: May 14, 2013

(54) SYSTEMS AND METHODS FOR REDUCING LOW FREQUENCY LOSS IN A MAGNETIC STORAGE DEVICE

(75) Inventor: Yang Cao, Longmont, CO (US)

(73) Assignee: AGERE Systems Inc., Allentown, PA (US)

( * ) Notice: Subject to any disclaimer, the term of this patent is extended or adjusted under 35 U.S.C. 154(b) by 130 days.

(21) Appl. No.: 12/992,943

(22) PCT Filed: Sep. 19, 2008

(86) PCT No.: PCT/US2008/076923
§ 371 (c)(1),
(2), (4) Date: Nov. 16, 2010

(87) PCT Pub. No.: WO2010/033120
PCT Pub. Date: Mar. 25, 2010

(65) Prior Publication Data
US 2011/0164332 A1    Jul. 7, 2011

(51) Int. Cl.
*G11B 5/035*    (2006.01)
*G11B 5/09*    (2006.01)

(52) U.S. Cl.
USPC ............................................. 360/65; 360/46

(58) Field of Classification Search .................. None
See application file for complete search history.

(56) References Cited

U.S. PATENT DOCUMENTS

| 6,347,288 | B1 | * | 2/2002 | Trammell et al. | ............. 702/107 |
| 7,974,037 | B2 | * | 7/2011 | Galbraith et al. | ............... 360/65 |
| 7,974,366 | B2 | | 7/2011 | Yang et al. | |
| 8,081,395 | B1 | * | 12/2011 | Ferris | .............................. 360/39 |
| 2003/0107831 | A1 | | 6/2003 | Erden et al. | |

FOREIGN PATENT DOCUMENTS

| CN | 2262779 Y | 9/1997 |
| CN | 2874444 Y | 2/2007 |
| JP | 62-262583 A | 11/1987 |
| JP | 05-292454 A | 11/1993 |
| JP | 05-315887 A | 11/1993 |
| JP | 11-120702 A | 4/1999 |

OTHER PUBLICATIONS

Erden et al "Baseline Wander Compensation for Perpendicular Recording" IEEE Transactions on Magnetics, vol. 40, No. 4, Jul. 2004.
PCT International Search Report for PCT/US2008/076923, form PCT/ISA/210.

* cited by examiner

*Primary Examiner* — Regina N Holder
(74) *Attorney, Agent, or Firm* — Hamilton DeSanctis & Cha

(57) ABSTRACT

Various embodiments of the present invention provide systems and methods for reducing low frequency loss in a magnetic storage device. For example, a data processing circuit is disclosed that includes an amplifier, two filters and a summation element. The amplifier provides an amplified output that is filtered using a first of the two filters to create a first filtered output. The first filtered output is then filtered using the second of the two filters to create a second filtered output. The summation element sums the first filtered output with the second filtered output to provide a pole altered output.

20 Claims, 4 Drawing Sheets

SYSTEMS AND METHODS FOR REDUCING LOW FREQUENCY LOSS IN A MAGNETIC STORAGE DEVICE

BACKGROUND OF THE INVENTION

The present inventions are related to systems and methods for transferring information, and more particularly to systems and methods for transferring information from a storage medium.

In a traditional storage device, information is longitudinally recorded on a magnetic storage medium. In a longitudinal recording scenario, data detection processes key on data transitions. As such, low frequency components (including any DC component) of the signal sensed from the magnetic storage medium does not convey information and may be eliminated. In addition, there is a desire to provide a high pass filter in a preamplifier associated with a data detection system to allow for fast write to read recovery.

In contrast to longitudinal recording where data detection keys on transitions, in newer perpendicular recording scenarios the magnitude of the field sensed from the magnetic storage medium carries information. In such a case, use of a high pass filter likely eliminates some information sensed from the magnetic storage medium. In addition, as disk format efficiency demands low coding overhead, the capability to provide for detecting low frequency components by means of RLL encoding is limited. In some cases, the aforementioned loss of low frequency energy has resulted in a lower signal to noise ratio in devices using perpendicular recording approaches. Prior data detection systems included the use of an error feedback signal derived from the detected bits to drive a spectrum mismatch compensation circuit. Such an approach may be used to preserve lower frequency information eliminated by the high pass filter, however, such an approach relies on DC and low frequency energy derived from detected data bits to drive the feedback error signal. In such an approach, latency becomes a major concern and ultimately limits any ability to obtain DC and low frequency energy.

Hence, for at least the aforementioned reasons, there exists a need in the art for advanced systems and methods for accessing information from a storage medium.

BRIEF SUMMARY OF THE INVENTION

The present inventions are related to systems and methods for transferring information, and more particularly to systems and methods for transferring information from a storage medium.

Various embodiments of the present invention provide data processing circuits that include an amplifier, two filters and a summation element. The amplifier provides an amplified output that is filtered using a first of the two filters to create a first filtered output. The first filtered output is then filtered using the second of the two filters to create a second filtered output. The summation element sums the first filtered output with the second filtered output to provide a pole altered output. In some instances of the aforementioned embodiments, the circuits further include a feedback loop from the read channel circuit to the amplifier. In such instances, the feedback loop utilizes an error signal that exhibits a frequency that is lower due to the inclusion of the second filter than a corresponding frequency where the first filter is used and not the second filter.

In some instances of the aforementioned embodiments, the first filter is a high pass filter. In some such instances, the second filter is a low pass filter. In particular instances, the corner frequency of the combination of the high pass filter and the low pass filter is lower than the corner frequency of the high pass filter. In various instances of the aforementioned embodiments, both the first filter and the second filter are created using a combination of circuit elements including, but not limited to, inductors, capacitors, and resistors. Thus, the filters may be, for example, LC filters or RC filters. Based on the disclosure provided herein, one of ordinary skill in the art will recognize a variety of filter implementations that may be used in relation to different embodiments of the present invention. In one or more instances of the aforementioned embodiments, the summation element is implemented as a physical coupling of the first filtered output and the second filtered output (i.e., a dot-or or wired-or configuration). Based on the disclosure provided herein, one of ordinary skill in the art will recognize a variety of summation element implementations that may be used in relation to different embodiments of the present invention.

In some instances of the aforementioned embodiments, the amplified output, the first filtered output, the second filtered output and the pole altered output are all analog electrical signals. In such instances, the circuit may further include an analog to digital converter that converts the pole altered output into a series of digital samples. Further, in some instances of the aforementioned embodiments, the circuits further include a read channel circuit that is operable to perform a data detection process on the series of digital samples to recover a data set represented by the amplified output. The data detection process may be performed using a data detector. The data detector may be, but is not limited to, a Viterbi algorithm detector or a peak detector.

In various instances of the aforementioned embodiments, the amplifier receives a minute electrical signal that is derived from a storage medium that includes information recorded in a perpendicular recording format. In some such instances, the storage medium is a magnetic storage medium, and the minute electrical signal is sensed by a read/write head assembly disposed in relation to the magnetic storage medium.

Other embodiments of the present invention provide methods for reducing low frequency loss in a magnetic storage medium. Such methods include providing a preamplifier circuit that includes an amplifier and a high pass filter. An output of the amplifier is filtered using the high pass filter to create a high pass filtered output. A pole altering filter is also provided and the high pass filtered output is filtered using the pole altering filter to create a pole altered output. The pole altered output and the high pass filtered output are summed to create a preamplifier output. In some instances of the aforementioned embodiments, the pole altering filter is a low pass filter. In such instances, the corner frequency of the combination of the high pass filter and the low pass filter may be lower than the corner frequency of the high pass filter. Thus, the low pass filter operates to alter the pole of the high pass filter.

Yet other embodiments of the present invention provide storage devices that include a storage medium that having a representation of a data set. A read/write head assembly is disposed in relation to the storage medium and is operable to provide an input signal representing information stored on the storage medium. An amplifier including a first filter and a second filter is included. The second filter is operable to alter a pole of the first filter, and the amplifier amplifies the input signal and provides an amplified signal. An analog to digital converter is included that converts the amplified signal into a series of digital samples, and a read channel circuit is included that is operable to perform a data detection process on the series of digital samples to recover the data set. In some instances of the aforementioned embodiments, the amplified output is a first amplified output, and the amplifier provides a second amplified output. The second amplified output is provided to the first filter which provides a first filtered output, and the first filtered output is provided to the second filter which provides a second filtered output. The first filtered output is summed with the second filtered output to create the first amplified output.

In various instances of the aforementioned embodiments, the representation of the data set is recorded in a perpendicular recording format. In particular instances of the aforementioned embodiments, the first filter is a high pass filter and the second filter is a low pass filter. In some such instances, the corner frequency of the combination of the high pass filter and the low pass filter is lower than the corner frequency of the high pass filter.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for transferring information, and more particularly to systems and methods for transferring information from a storage medium.

Various embodiments of the present invention operate to increase signal to noise ratio due to spectrum mismatch caused by a preamplifier incorporating a high pass filter. In various instances of the aforementioned embodiments, an output from the high pass filter incorporated in the preamplifier is passed through a low pass filter, and the output of the high pass filter is summed with the output of the low pass filter. The result is a preamplifier with an altered pole where low frequency energy is recovered in relation to given bit periods. The output from such a pole altered preamplifier may then be provided to an analog to digital converter that provides a series of digital samples corresponding to the output of the pole altered preamplifier.

Figure 1A:
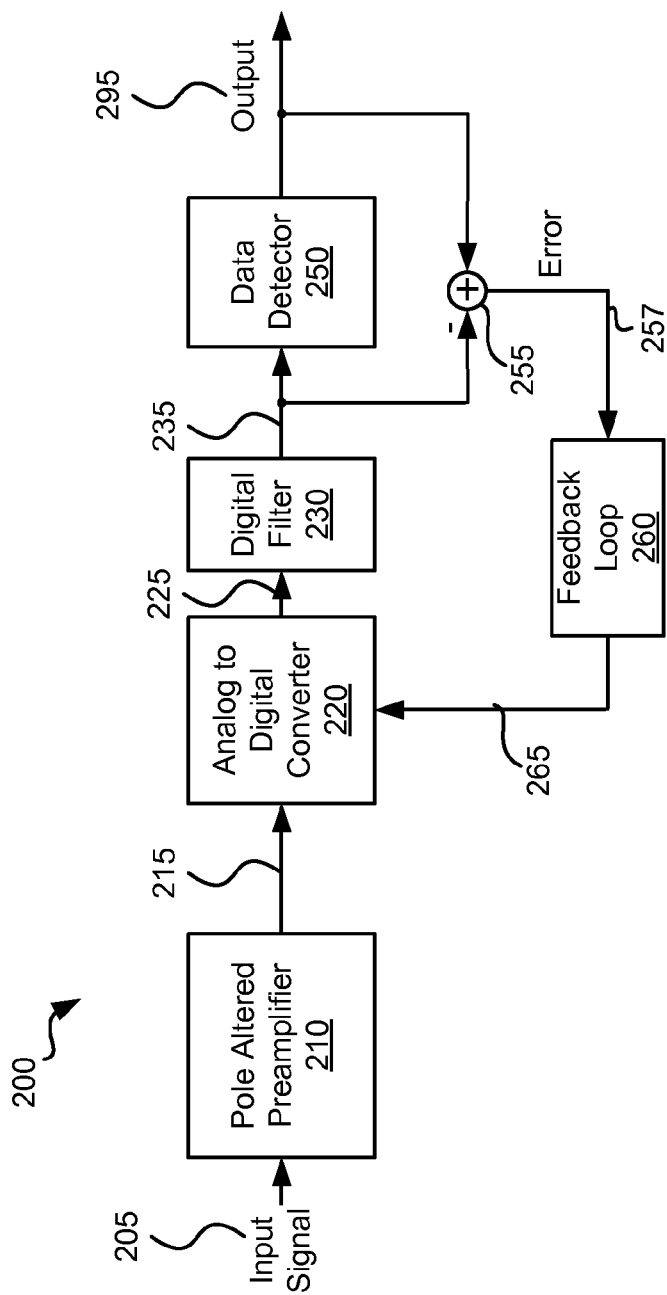
FIG. 1a depicts a data detection system including a pole altered preamplifier in accordance with one or more embodiments of the present invention.

Turning to FIG. 1a, a data detection system 200 including a pole altered preamplifier 210 is shown in accordance with one or more embodiments of the present invention. Pole altered preamplifier 210 receives an input signal 205. Input signal 205 may be a minute analog signal representative of magnetically recorded data from a magnetic storage medium. Based on the disclosure provided herein, one of ordinary skill in the art will recognize a variety of input signals and sources thereof that may be used in relation to different embodiments of the present invention. Pole altered preamplifier 210 amplifies input signal and performs a standard high pass filtering of the signal that results in a reduction of low frequency energy evident in input signal 205. In addition, pole altered amplifier 210 performs another filtering process that effectively operates to alter the pole associated with the high pass filter process, and provides an amplified output 215. This pole altering filter process results in a recovery of at least some of the originally evident low frequency energy in input signal 205.

Amplified output 215 is provided to an analog to digital converter 220. Analog to digital converter 220 may be any analog to digital converter known in the art, and provides a series of digital samples 225 corresponding to different sampling increments of the received analog signal. Digital samples 225 are provided to a digital filter 230. In some cases, digital filter 230 is a digital finite impulse response filter as is known in the art. A filtered output 235 representing the received input signal 205 is provided to a data detector 250 that algorithmically determines a proper bit sequence based on the received input. Data detector 250 may be any data detector known in the art. For example, data detector 250 may be, but is not limited to, a Viterbi algorithm data detector or a peak detector. Based on the disclosure provided herein, one of ordinary skill in the art will recognize a variety of data detectors that may bee used in relation to different embodiments of the present invention.

An output 295 is provided from data detector 250. Filtered output 235 is subtracted from output 295 using a summation element 255 to provide an error term 257 (i.e., a difference between the input provided to data detector 250 and the output of data detector 250). Error term 257 is used in relation to a feedback loop 260 that provides a feedback signal 265 to, for example, analog to digital converter 220 in an effort to minimize error term 257. Feedback loop 260 may include various different circuitry as is known in the art. For example, feedback loop 260 may include offset compensation circuitry and feedback signal 265 is provided to pole altered preamplifier to perform some level of offset compensation. Alternatively or in addition, feedback loop 260 may include a digital phase lock loop that is operable to adjust the phase during which amplified signal 215 is sampled using analog to digital converter 220. Based on the disclosure provided herein, one of ordinary skill in the art will recognize a variety of feedback loops and corresponding feedback circuitry that may be used in relation to different embodiments of the present invention.

Figure 1B:
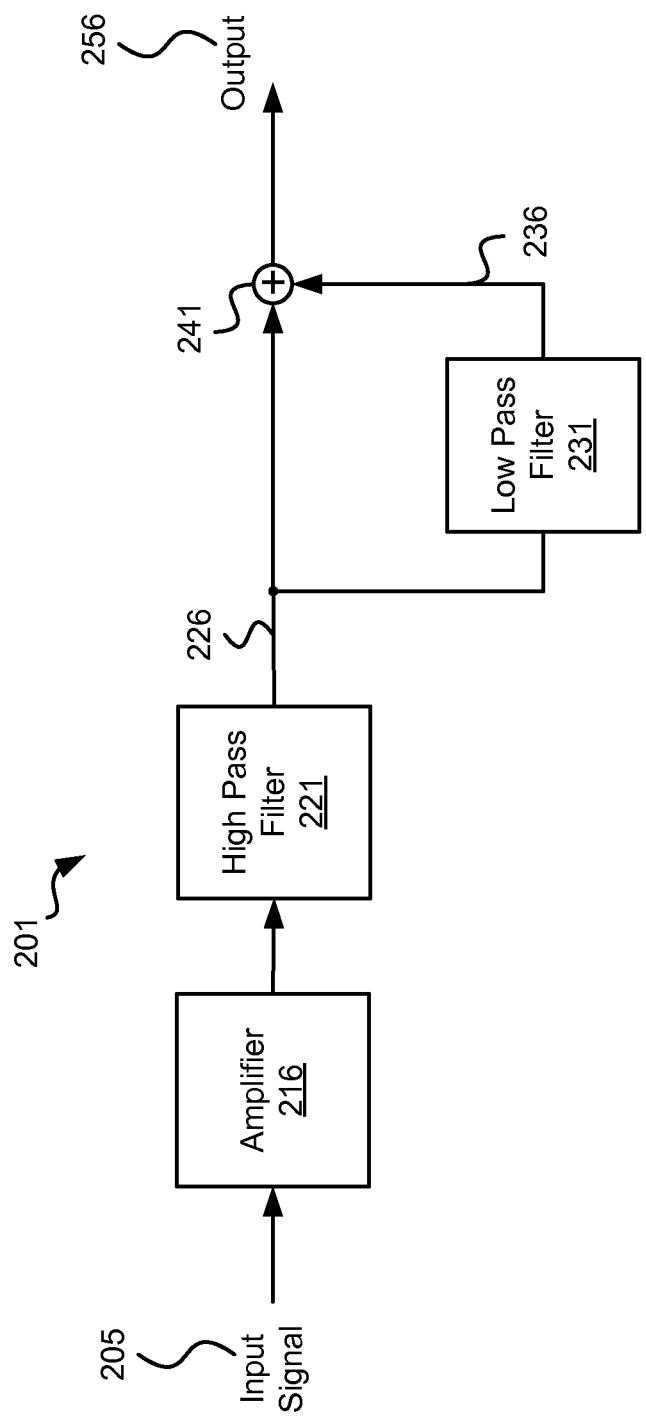
FIG. 1b depicts a pole altered preamplifier in accordance with some embodiments of the present invention.

Turning to FIG. 1b, a pole altered preamplifier 201 is depicted in accordance with some embodiments of the present invention. Pole altered preamplifier 201 includes an amplifier 216 that receives input signal 205. Amplifier 216 may be any amplifier known in the art that is capable of receiving a minute analog signal and amplifying such a signal. Amplifier 216 amplifies input signal 205 and provides an amplified output 219 to a high pass filter 221. High pass filter 221 may be any filter known in that art that is designed to allow signals exhibiting relatively high frequencies to pass while rejecting signals at lower frequencies. In one particular embodiment of the present invention, high pass filter 221 is implemented using a combination of resistors, capacitors and/or inductors. High pass filter 221 provides a high pass output 226.

High pass output 226 is provided to a low pass filter 231. Low pass filter 231 may be any filter known in that art that is designed to allow signals exhibiting relatively low frequencies to pass while rejecting signals at higher frequencies. In one particular embodiment of the present invention, low pass filter 231 is implemented using a combination of resistors, capacitors and/or inductors. Low pass filter 231 provides a low pass output 236. Low pass output 236 is aggregated with high pass output 226 using a summation element 241 to create a filtered output 256 from pole altered preamplifier 201. By aggregating low pass output 236 with high pass output 226 to create filtered output 256, a pole established by high pass filter 221 is altered. In one particular embodiment of the present invention, the corner frequency of low pass filter 221 matches the pole established by high pass filter 221 and results in the addition of some lost energy corresponding to low frequency signals back into the system.

It should be noted that pole altered preamplifier 201 may be constructed by adding low pass filter 231 and summation element 241 to an existing preamplifier circuit incorporating a high pass filter. Thus, such an approach does not necessitate a circuit redesign in order to use circuitry originally designed for use in relation to longitudinal recording to that for use in relation to perpendicular redesign. Further, it should be noted that while pole altered preamplifier 201 includes a low pass filter designed to alter the pole established by high pass filter 221, that another type of filter such as a bandpass filter may be used to create a similar effect. Based on the disclosure provided herein, one of ordinary skill in the art will recognize a variety of pole modifying filters that may be used in relation to different embodiments of the present invention.

Figure 2:
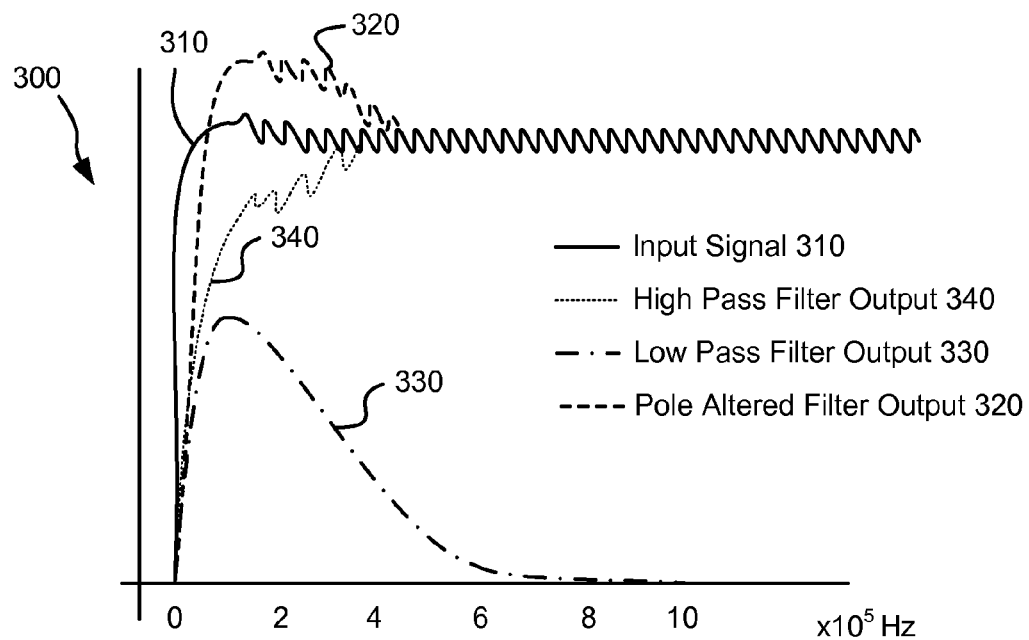
FIG. 2 is a diagram depicting an exemplary input and an exemplary output of a pole altered filter along with interim signals in accordance with a particular embodiment of the present invention.

Turning to FIG. 2, a diagram 300 depicts the signal spectrum frequency of an exemplary input 310 (shown as a solid line) and the signal spectrum of an exemplary pole altered filter output 320 in accordance with one or more embodiments of the present invention. The aforementioned signals are shown in relation to the signal spectrum of a high pass filter output 340 and the signal spectrum of a low pass filter output 330 corresponding to exemplary input 310. As shown, the spectrum of exemplary input 310 includes substantial low frequency energy that is reduced in high pass filter output 340. By aggregating low pass filter output 330 with high pass filter output 340, pole altered filter output 320 is produced. As can be seen, the effective 3 dB frequency of pole altered filter output 320 is pushed much lower than that of high pass filter output 340. This results in a reduction of the signal energy loss and a corresponding increase in signal to noise ratio.

It should be noted that the latency of a feedback signal (e.g., a signal passed through both feedback loop 260 and detector 250) is the same regardless of whether a pole altered preamplifier or a standard preamplifier including a high pass filter is used. Thus, by pushing the effective corner frequency of the high pass filter lower, the fixed latency of a feedback loop becomes less of a limitation. The latency limitation is less significant because any error signal feedback (e.g., error signal 257) exhibits a lower frequency than it would have exhibited had the signal only been high pass filtered. This lower frequency renders the time required to traverse the feedback loop (e.g., feedback loop 260 plus time through detector 250) less significant.

Figure 3:
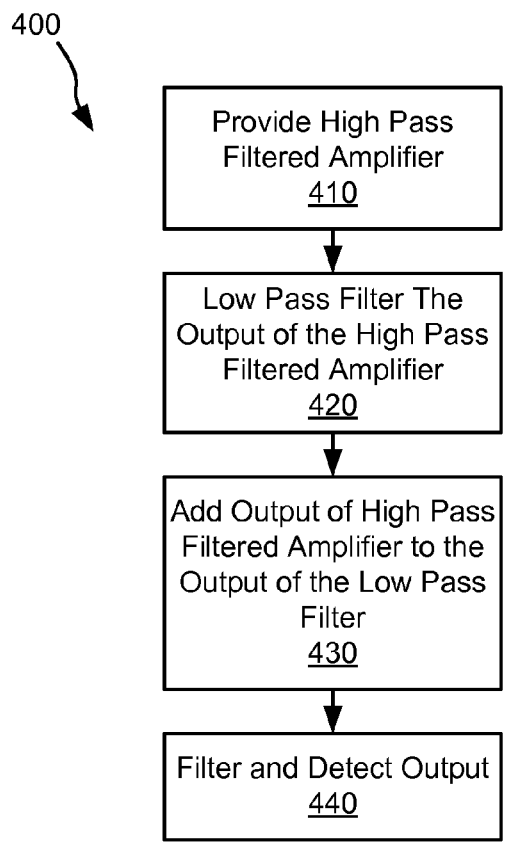
FIG. 3 depicts a flow diagram showing a method for recovering low frequency data in a data detection system in accordance with some embodiments of the present invention.

Turning to FIG. 3, a flow diagram 400 shows a method for recovering low frequency data in a data detection system in accordance with some embodiments of the present invention. Following flow diagram 400, an amplifier including a high pass filter is provided (block 410). A high pass filtered output from the amplifier is provided to a low pass filter where it is low pass filtered (block 415). The high pass filtered output is then added to the low pass filter output (block 430). The sum of the outputs (block 430) may then be provided to a receiving circuit where it can be converted from an analog signal domain to a digital signal domain, digitally filtered, and processed using a data detector (block 440).

Figure 4:
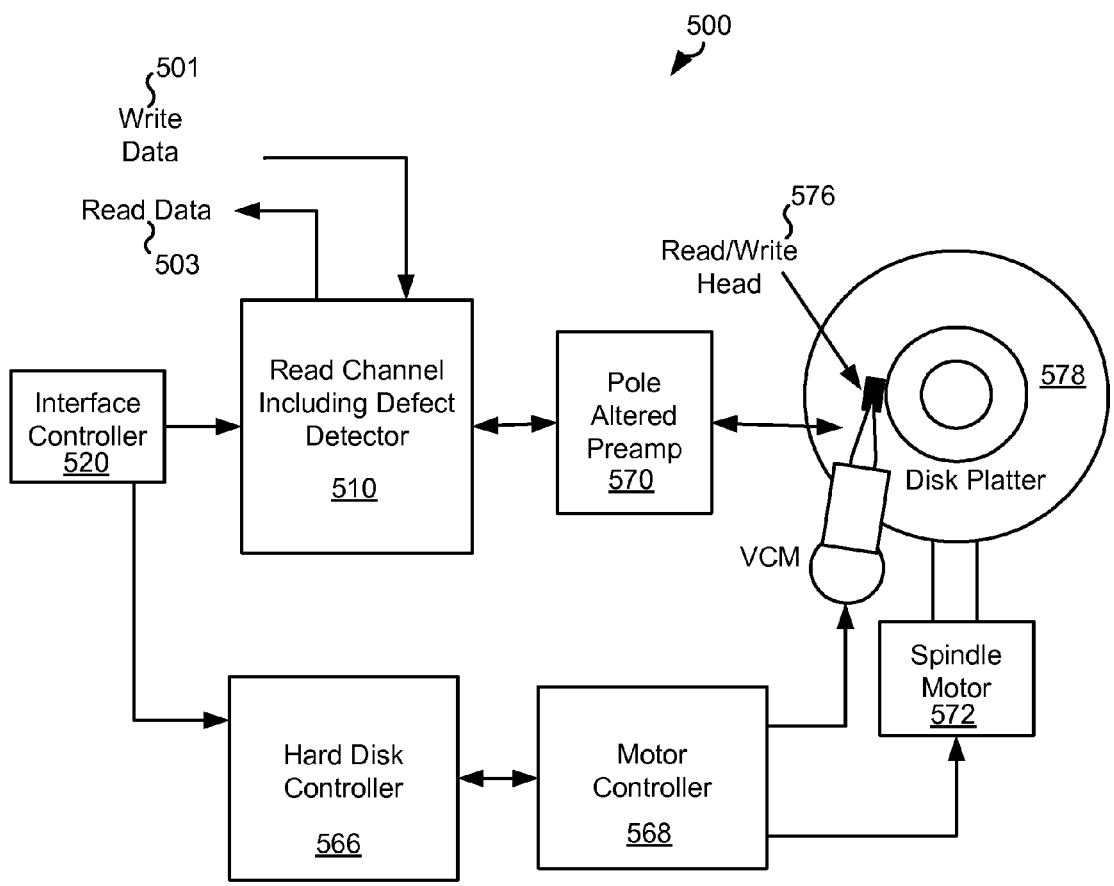
FIG. 4 depicts a storage system including a pole altered preamplifier in accordance with various embodiments of the present invention.

Turning to FIG. 4, a storage system 500 including a pole altered preamplifier 570 is shown in accordance with various embodiments of the present invention. Storage system 500 may be, for example, a hard disk drive. In addition to pole altered preamplifier 570, storage system 500 includes a read channel 510 with a data detector. The incorporated data detector may be any data detector known in the art including, for example, a Viterbi algorithm data detector. Storage system 500 also includes an interface controller 520, a hard disk controller 566, a motor controller 568, a spindle motor 572, a disk platter 578, and a read/write head 576. Interface controller 520 controls addressing and timing of data to/from disk platter 578. The data on disk platter 578 consists of groups of magnetic signals that may be detected by read/write head assembly 576 when the assembly is properly positioned over disk platter 578. In one embodiment, disk platter 578 includes magnetic signals recorded in accordance with a perpendicular recording scheme.

In a typical read operation, read/write head assembly 576 is accurately positioned by motor controller 568 over a desired data track on disk platter 578. Motor controller 568 both positions read/write head assembly 576 in relation to disk platter 578 and drives spindle motor 572 by moving read/write head assembly to the proper data track on disk platter 578 under the direction of hard disk controller 566. Spindle motor 572 spins disk platter 578 at a determined spin rate (RPMs). Once read/write head assembly 578 is positioned adjacent the proper data track, magnetic signals representing data on disk platter 578 are sensed by read/write head assembly 576 as disk platter 578 is rotated by spindle motor 572. The sensed magnetic signals are provided as a continuous, minute analog signal representative of the magnetic data on disk platter 578. This minute analog signal is transferred from read/write head assembly 576 to read channel module 564 via pole altered preamplifier 570. Pole altered preamplifier 570 is operable to amplify the minute analog signals accessed from disk platter 578. In addition, pole altered preamplifier 570 provides a combination of high pass filtering and low pass filtering that operates to recover low frequency energy from the information received from disk platter 578. In particular instances, pole altered preamplifier may be implemented similar to that discussed above in relation to FIG. 2*b*. In turn, read channel module 510 decodes and digitizes the received analog signal to recreate the information originally written to disk platter 578. This data is provided as read data 503 to a receiving circuit. A write operation is substantially the opposite of the preceding read operation with write data 501 being provided to read channel module 510. This data is then encoded and written to disk platter 578.

In conclusion, the invention provides novel systems, devices, methods and arrangements for reducing low frequency loss in a data detection system. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing circuit, wherein the circuit comprises:
an amplifier providing an amplified output;
a first filter configured to receive the amplified output and to provide a first filtered output;
a second filter operable to alter a pole of the first filter, wherein the second filter is configured to receive the first filtered output and to provide a second filtered output; and
a summation element, wherein the summation element is operable to sum the first filtered output with the second filtered output to provide a pole altered output.

2. The data processing circuit of claim 1, wherein the circuit further comprises:
an analog to digital converter, wherein the analog to digital converter is operable to convert the pole altered output into a series of digital samples.

3. The data processing circuit of claim 2, wherein the circuit further comprises:
a read channel circuit, wherein the read channel circuit is operable to perform a data detection process on the series of digital samples to recover a data set represented by the amplified output.

4. The data processing circuit of claim 3, wherein the data detection process is performed using a data detector selected from a group consisting of: a Viterbi algorithm detector and a peak detector.

5. The data processing circuit of claim 1, wherein the circuit further comprises a feedback loop from the read channel circuit to the amplifier, wherein the feedback loop utilizes an error signal that exhibits a frequency that is lower due to the inclusion of the second filter compared to a corresponding frequency where the second filter is not utilized.

6. The data processing circuit of claim 1, wherein the first filter is a high pass filter.

7. The data processing circuit of claim 6, wherein the second filter is a low pass filter.

8. The circuit of claim 7, wherein the corner frequency of the combination of the high pass filter and the low pass filter is lower than the corner frequency of the high pass filter.

9. The data processing circuit of claim 1, wherein the amplifier receives a minute electrical signal, and wherein the minute electrical signal is derived from a storage medium including information recorded in a perpendicular recording format.

10. The data processing circuit of claim 9, wherein the storage medium is a magnetic storage medium, and wherein the minute electrical signal is sensed by a read/write head assembly disposed in relation to the magnetic storage medium.

11. The data processing circuit of claim 1, wherein both the first filter and the second filter are created using a combination of circuit elements selected from a group consisting of inductors, capacitors, and resistors.

12. The data processing circuit of claim 1, wherein the summation element is a physical coupling of the first filtered output and the second filtered output.

13. A method for reducing low frequency loss in a magnetic storage medium, the method comprising:
providing a preamplifier circuit, wherein the preamplifier circuit includes an amplifier and a high pass filter, and wherein an output of the amplifier is filtered using the high pass filter to create a high pass filtered output;
providing a pole altering filter;
filtering the high pass filtered output using the pole altering filter to create a pole altered output; and
summing the pole altered output with the high pass filtered output to create a preamplifier output.

14. The method for reducing low frequency loss in a magnetic storage medium of claim 13, wherein the pole altering filter is a low pass filter, and wherein the corner frequency of the combination of the high pass filter and the low pass filter is lower than the corner frequency of the high pass filter.

15. A storage device, wherein the storage device comprises:
a storage medium, wherein the storage medium includes a representation of a data set;
a read/write head assembly disposed in relation to the storage medium and operable to provide an input signal representing information stored on the storage medium;
an amplifier including a first filter and a second filter, wherein the second filter is operable to alter a pole of the first filter, and wherein the amplifier is operable to amplify the input signal and to provide an amplified signal;
an analog to digital converter, wherein the analog to digital converter is operable to convert the amplified signal into a series of digital samples; and
a read channel circuit, wherein the read channel circuit is operable to perform a data detection process on the series of digital samples to recover the data set.

16. The storage device of claim 15, wherein the representation of the data set is recorded in a perpendicular recording format.

17. The storage device of claim 15, wherein the first filter is a high pass filter.

18. The storage device of claim 17, wherein the second filter is a low pass filter.

19. The storage device of claim 18, wherein the corner frequency of the combination of the high pass filter and the low pass filter is lower than the corner frequency of the high pass filter.

20. The storage device of claim 15, wherein the amplified output is a first amplified output, wherein the amplifier provides a second amplified output, wherein the second amplified output is provided to the first filter which provides a first filtered output, wherein the first filtered output is provided to the second filter which provides a second filtered output, and wherein the first filtered output is summed with the second filtered output to create the first amplified output.

* * * * *